(12) United States Patent
Reigner et al.

(10) Patent No.: US 10,351,252 B2
(45) Date of Patent: Jul. 16, 2019

(54) AIRCRAFT COMPRISING A PROPULSION ASSEMBLY INCLUDING A PAIR OF PROPELLERS AT THE REAR OF THE FUSELAGE

(71) Applicant: SAFRAN AIRCRAFT ENGINES, Paris (FR)

(72) Inventors: Pierre-Alain Jean Philippe Reigner, Moissy-Cramayel (FR); Antoine Jean-Philippe Beaujard, Moissy-Cramayel (FR); Augustin Marc Michel Curlier, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 15/764,302

(22) PCT Filed: Sep. 26, 2016

(86) PCT No.: PCT/FR2016/052441
§ 371 (c)(1),
(2) Date: Mar. 28, 2018

(87) PCT Pub. No.: WO2017/060584
PCT Pub. Date: Apr. 13, 2017

(65) Prior Publication Data
US 2018/0281979 A1    Oct. 4, 2018

(30) Foreign Application Priority Data

Oct. 5, 2015    (FR) .................................... 15 59450

(51) Int. Cl.
*B64D 35/06*    (2006.01)
*B64D 27/14*    (2006.01)
(Continued)

(52) U.S. Cl.
CPC .............. *B64D 27/14* (2013.01); *B64C 11/48* (2013.01); *B64D 33/02* (2013.01); *B64D 35/06* (2013.01);
(Continued)

(58) Field of Classification Search
CPC ........ B64D 27/14; B64D 27/10; B64D 35/00; B64D 35/06; B64D 35/08; F02K 3/12
See application file for complete search history.

(56) References Cited

U.S. PATENT DOCUMENTS 2,120,821 A * 6/1938 Waseige ................ B64D 35/08
244/60
2,480,806 A * 8/1949 Desmoulins ............ F16H 48/08
416/129
(Continued)

FOREIGN PATENT DOCUMENTS

EP    0272822 A1    6/1988
EP    2557033 A2    2/2013
(Continued)

OTHER PUBLICATIONS

International Search Report and Written Opinion received for PCT Patent Application No. PCT/FR2016/052441, dated Jan. 9, 2017, 17 pages (8 pages of English Translation and 9 pages of Original Document).

*Primary Examiner* — Philip J Bonzell
*Assistant Examiner* — Tye William Abell
(74) *Attorney, Agent, or Firm* — Womble Bond Dickinson (US) LLP

(57) ABSTRACT

The present invention relates to an aircraft comprising a fuselage (1), a propulsion unit (7) at the rear tip of the fuselage and at least two engines (3, 5) each driving an engine shaft (32, 52), the propulsion unit including at least one propeller (71, 73) driven mechanically by the engine shafts (32, 52), characterized in that the propulsion unit (7)
(Continued)

includes two propellers (71, 73), each of the propellers being driven by a propeller shaft (72, 74), the two propeller shafts being driven by the engine shafts (32, 52) via a first differential epicyclic gear train (40). Specifically, the input of the first differential gear train (40) is connected to the output of a second differential epicyclic gear train (60), the second differential gear train (60) including two inputs (61c2, 62c2), each of said two inputs being connected mechanically to one of said engine shafts (32, 52).

9 Claims, 3 Drawing Sheets

(51) Int. Cl.
    *B64C 11/48*     (2006.01)
    *F02K 3/072*     (2006.01)
    *F02C 7/36*     (2006.01)
    *B64D 33/02*     (2006.01)
    *B64D 35/08*     (2006.01)
    *F16H 48/05*     (2012.01)
    *F16H 48/08*     (2006.01)
    *F16H 48/10*     (2012.01)
(52) U.S. Cl.
    CPC ............. *B64D 35/08* (2013.01); *F02C 7/36* (2013.01); *F02K 3/072* (2013.01); *F16H 48/05* (2013.01); *F16H 48/08* (2013.01); *F16H 48/10* (2013.01); *F05D 2220/323* (2013.01); *F05D 2260/40311* (2013.01)

(56) References Cited

U.S. PATENT DOCUMENTS

| | | | | |
|---|---|---|---|---|
| 2,581,320 | A | * | 1/1952 | Burton ................ B64D 35/06 244/55 |
| 2,753,005 | A | * | 7/1956 | Peterson ............. B64D 35/06 416/121 |
| 4,587,866 | A | * | 5/1986 | Kraus ................ F16H 37/086 475/208 |
| 5,090,869 | A | | 2/1992 | Wright |
| 2012/0128487 | A1 | | 5/2012 | Eames |
| 2012/0329593 | A1 | * | 12/2012 | Larrabee ............. B64C 39/024 475/5 |
| 2013/0175892 | A1 | * | 7/2013 | Buttner .................. H02K 9/06 310/63 |

FOREIGN PATENT DOCUMENTS

| | | |
|---|---|---|
| FR | 1339141 A | 10/1963 |
| FR | 2609136 A1 | 7/1988 |
| FR | 2955085 A1 | 7/2011 |
| FR | 2997681 A1 | 5/2014 |
| WO | 2015/134081 A2 | 9/2015 |

\* cited by examiner

AIRCRAFT COMPRISING A PROPULSION ASSEMBLY INCLUDING A PAIR OF PROPELLERS AT THE REAR OF THE FUSELAGE

FIELD OF THE INVENTION

The present invention relates to the aeronautical field in which aircraft are propelled at least in part by a fan rotor assembly positioned at the rear in the extension of the fuselage. The fan rotors are driven by motors such as turbojets.

PRIOR ART

A new aircraft architecture was proposed in the patent application FR-A1-2 997 681, making it possible to reduce noise pollution and fuel consumption of the aircraft by limiting aerodynamic drag.

In the context of such an architecture, an aircraft is propelled by a propulsion system with counter-rotating fans, integrated into the rear of the fuselage of the aircraft, in the extension thereof. The propulsion system comprises two gas generators which supply a power turbine having two counter-rotating rotors for driving two fan rotors, the fans being positioned downstream of the gas generators. The gas generators are gas turbine engines incorporated into the fuselage with separate air inputs that each supply a gas generator. The diameter of the nacelle surrounding the fan rotors is, according to this embodiment, substantially equal to that of the largest cross-section of the fuselage of the aircraft. This nacelle integrates the power turbine.

In the context of such a solution, the ability to generate thrust may not be maintained in the event of failure of the part of the propulsion system made up of the counter-rotating turbine and the counter-rotating fans. For example, in the event of destruction of the blades of the counter-rotating turbine, a total obstruction of the hot inner flow may be caused by the debris. This would result in the total loss of thrust and a high pumping probability of the gas generators due to the sudden change in the flow cross-section.

In addition, the installation method of the gas generators being fully integrated into the fuselage assumes an arrangement of air inputs that makes it possible to not supply the generators with the boundary layer developed on the fuselage of the aircraft; the fact that this has a speed which is substantially slower than the flying speed is detrimental to the thermal efficiency of the gas generators.

Patent FR 1 339 141 discloses a propulsion device positioned at the rear in the cone of the fuselage in such a way as to absorb the boundary layer and comprising a propeller positioned in a channel downstream of the cone of the fuselage, supplied with air along the fuselage and driven by turbojets which are fixed to the rear of the fuselage. The drive is ensured either by a mechanical transmission or by the gas flow coming from the motors.

The object of the present invention is to provide a solution which is suitable for the architecture type of the aircraft and propellant as described above, in which there is a pair of propellers such that the assembly operates optimally regardless of the different flight conditions. In particular, the problem presented concerns the drive of the pair of propellers by a motor assembly which is likely to have speed and torque variations within a certain operating margin.

An object of the invention is also to supply the motors without ingesting the fuselage boundary layer or distorting the flow in order to maximise thermal efficiency. It is also a question of maintaining the ability to supply the propellant with the maximum amount of air coming from the boundary layer in order to maximise propulsion efficiency.

The object of the present invention is also to maintain a thrust capacity in event of major failure of the propulsion unit.

DISCLOSURE OF THE INVENTION

These objectives are achieved with an aircraft comprising a fuselage, a propellant at the tail cone of the fuselage and at least two motors each driving a motor shaft, wherein the propellant comprises at least one propeller which is mechanically driven by the motor shafts. According to the invention, the aircraft is characterised in that the propellant comprises two propellers, each of the propellers being driven by a propeller shaft, the two propeller shafts being driven by motor shafts by means of a transmission mechanism comprising first and second differential epicyclic gear trains, the first differential epicyclic gear train comprising an input which is connected to the output of the second differential epicyclic gear train and the second differential gear train comprising two inputs, each of said two inputs being mechanically connected to one of said motor shafts.

It should be noted that the two propellers are counter-rotating propellers.

Advantageously, but in a non-limiting manner, the motor shafts extend radially with respect to the axis of the fuselage.

Advantageously, but in a non-limiting manner, the motor shafts are arranged in planes which are substantially perpendicular to the axis of the fuselage and are different from one another.

More particularly, the first differential epicyclic gear train comprises an input and two outputs, wherein the input is mechanically connected to the two motor shafts and each of the two outputs drives a propeller shaft. And according to a preferred embodiment, the first differential epicyclic gear train comprises a side gear at the input and a ring and a planet carrier at the outputs.

In accordance with another feature of the invention, the input of the first differential gear train is connected to the output of a second differential epicyclic gear train, wherein the second differential gear train comprises two inputs, each of said two inputs being mechanically connected to one of said motor shafts.

Given that the two motors drive the motor shafts at the same speed with the same torque, this system makes it possible to supply power coming from two sources with potential but relatively low variations in speed or torque provided, to a single output shaft. This shaft is then connected to a differential train, making it possible to distribute the torque across the two propellers.

According to one embodiment, the axis of rotation of the input of the first differential epicyclic gear train is coaxial with the axis of rotation of the output of the second differential epicyclic gear train. In addition, the second differential epicyclic gear train comprises a coaxial planet carrier which is formed integrally with the output of the second differential epicyclic gear train, wherein the planet gears of the planet carrier mesh on two opposite rings which are coaxial with the planet carrier, the two rings each being driven by one of the motor shafts.

More particularly, the planet gears of the second differential epicyclic gear train have a radial axis with respect to the axis of rotation of the planet carrier. Finally, the motor shafts are arranged radially with respect to the axis of rotation of the planet carrier.

Advantageously, the motors mounted on the fuselage of the aircraft are gas turbine engines, in particular turbojets whose air input ducts are spaced apart from the fuselage.

The aim of spacing apart the air input ducts is, in particular, to avoid the ingestion of the boundary layer of the air flowing along the fuselage by the motors, avoiding disturbances associated with them which are disadvantageous in terms of the thermal efficiency of the motor.

The motors, as turbojets, are configured in such a way as to propel the aircraft in the event of failure of the propellant. In fact, turbojets can propel the aircraft independently of the propellant if necessary.

Advantageously, the motors are single-flow turbojets and more particularly twin-spool turbojets.

The propellers are advantageously mounted in a fan casing.

DESCRIPTION OF THE FIGURES

The invention will be better understood, and other objects, details, features and advantages thereof will emerge more clearly when reading the following detailed explanatory description of an embodiment of the invention given by way of purely illustrative and non-limiting example, with reference to the appended schematic drawing. In these drawings.

DETAILED DESCRIPTION OF AN EMBODIMENT OF THE INVENTION

Figure 1:
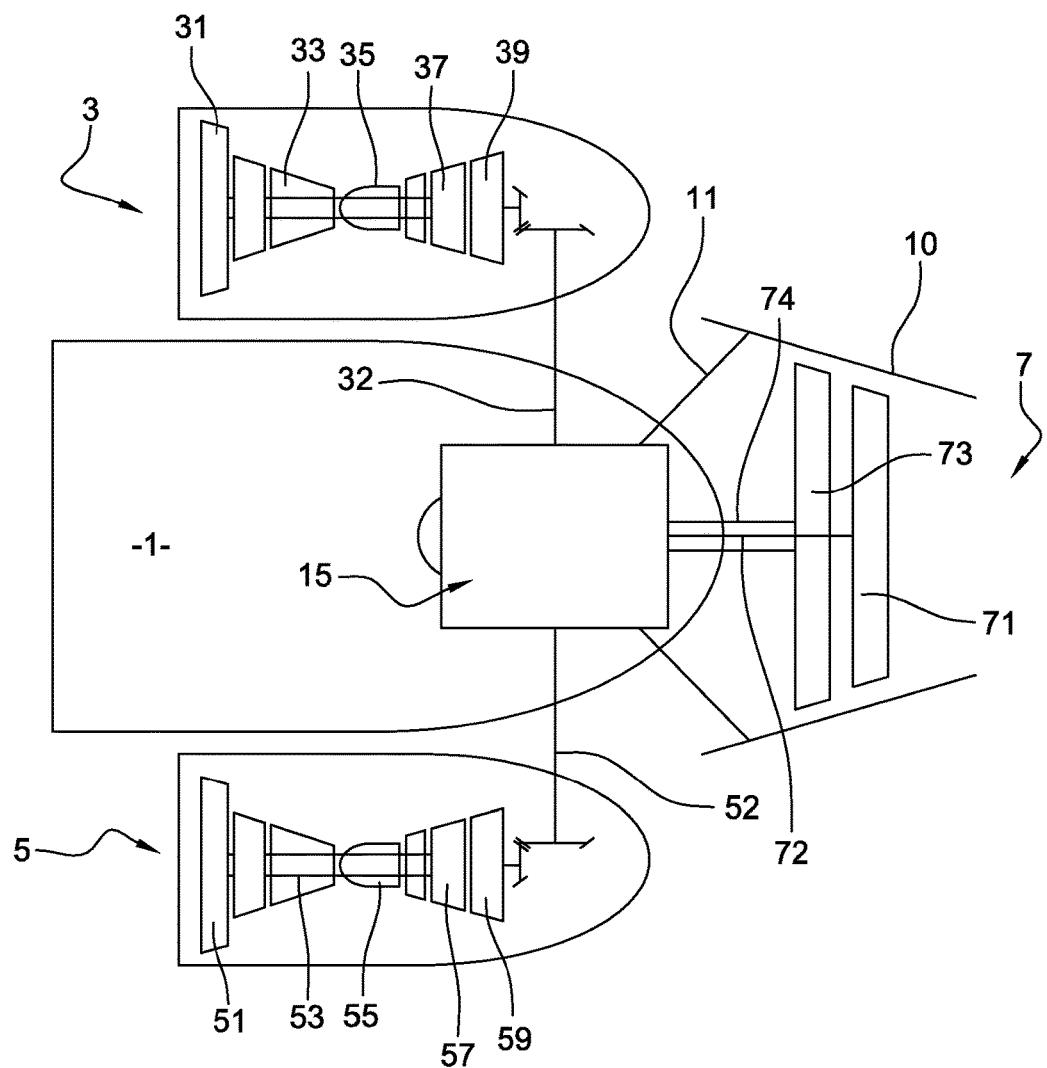
FIG. 1 schematically shows the rear of the fuselage of an aircraft with the propulsion system according to the invention.

The propulsion assembly is mounted at the rear of the aircraft, of which the rear part of the fuselage 1 has been shown. The two gas motors 3 and 5 are mounted on this fuselage having a longitudinal axis X by means of pylons which are arranged appropriately but are not shown. These two pylons are positioned in such a way as to set aside sufficient space between the wall of the fuselage 1 and the air input duct of each of the motors 3 and 5, thus preventing the air of the boundary layer formed along the fuselage from being directed towards the air input ducts. This air flows along the fuselage towards the rear.

The motors are turbojets in the example illustrated here. They thus comprise a low-pressure body formed of a rotor with a compressor 31; 51 and a turbine 39; 59, and a high-pressure body formed of a rotor with a compressor 33; 53 and a turbine 37; 57. The compressors power a combustion chamber 35; 55, the gas products of which drive the high-pressure and low-pressure turbines successively. The gases are guided towards the exhaust channels 3T and 5T immediately downstream of the turbines.

A propellant is mounted at the tail cone of the fuselage 1. The propellant comprises a pair 7 of propellers formed of two coaxial and counter-rotating bladed rotors, 71 and 73, in the axis of the fuselage. The pair of counter-rotating propellers 7 rotates inside a fan casing 10 which is connected to the fuselage 1 by arms 11 and which defines an air flow stream. Upstream of the casing 11, a space is provided between the leading edge and the fuselage in order to enable the air supply for the pair 7. During operation, the two propellers suck in air at the cone of the fuselage and evacuate it towards the rear through the nozzle that the housing 10 forms.

The two propeller rotors 71 and 73 are formed integrally with coaxial propeller shafts 72, 74. These propeller shafts 72, 74 are rotatably driven by motor shafts 32, 52 by means of a power transmission mechanism 15 represented by a single block and described below. The motor shafts 32, 52 extend radially with respect to the axis of the fuselage. In particular, each motor shaft 32, 52 is driven by a motor 3, 5 via an angular gearbox. The motor shafts 32, 52 are each positioned radially between the motors 3 and 5 and the power transmission mechanism 15 of the shafts 32, 35 towards the drive shafts 72 and 74 of the propellers.

Figure 2:
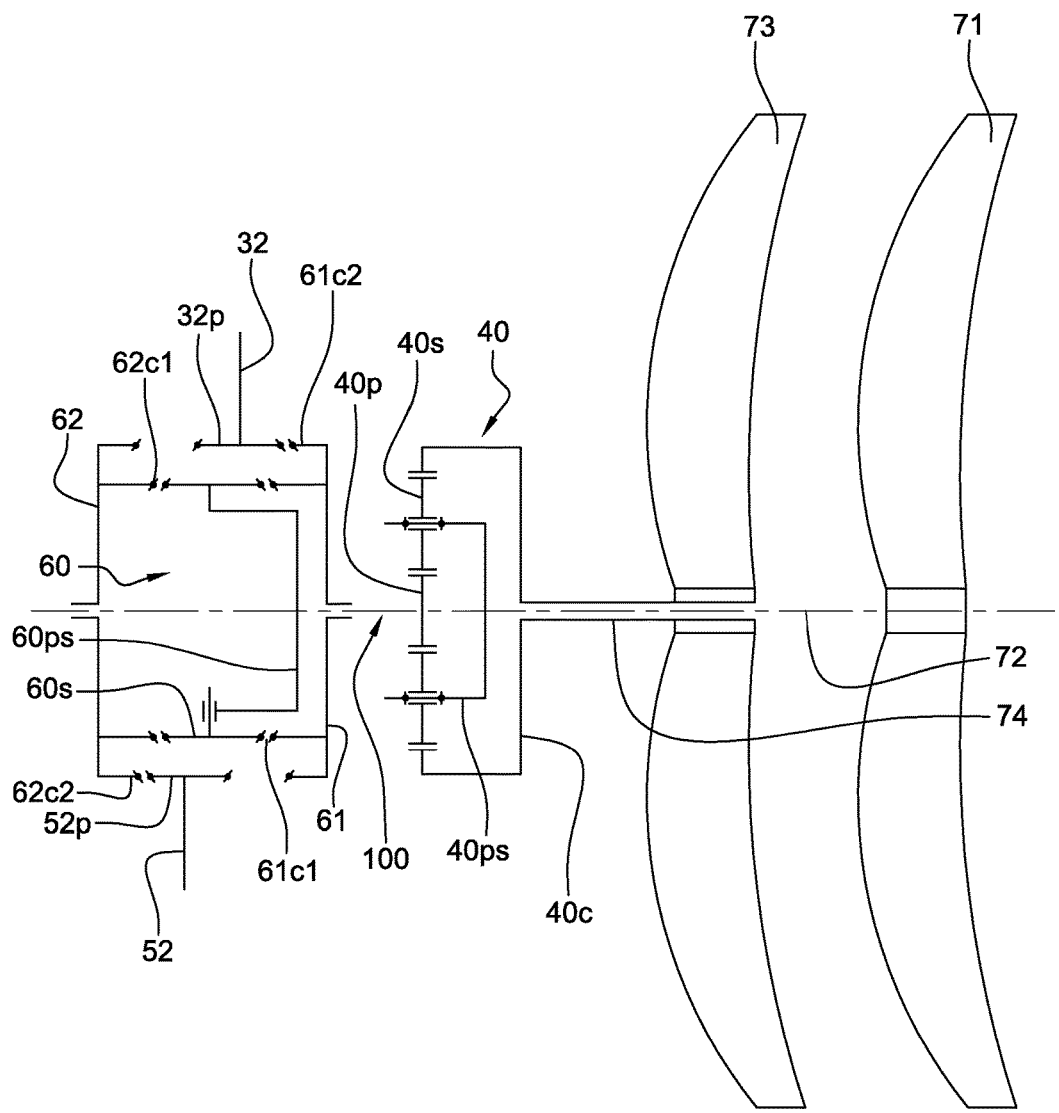
FIG. 2 shows the mechanical transmission between the motor shafts and the two propulsion propellers of the aircraft in detail.
Figure 3:
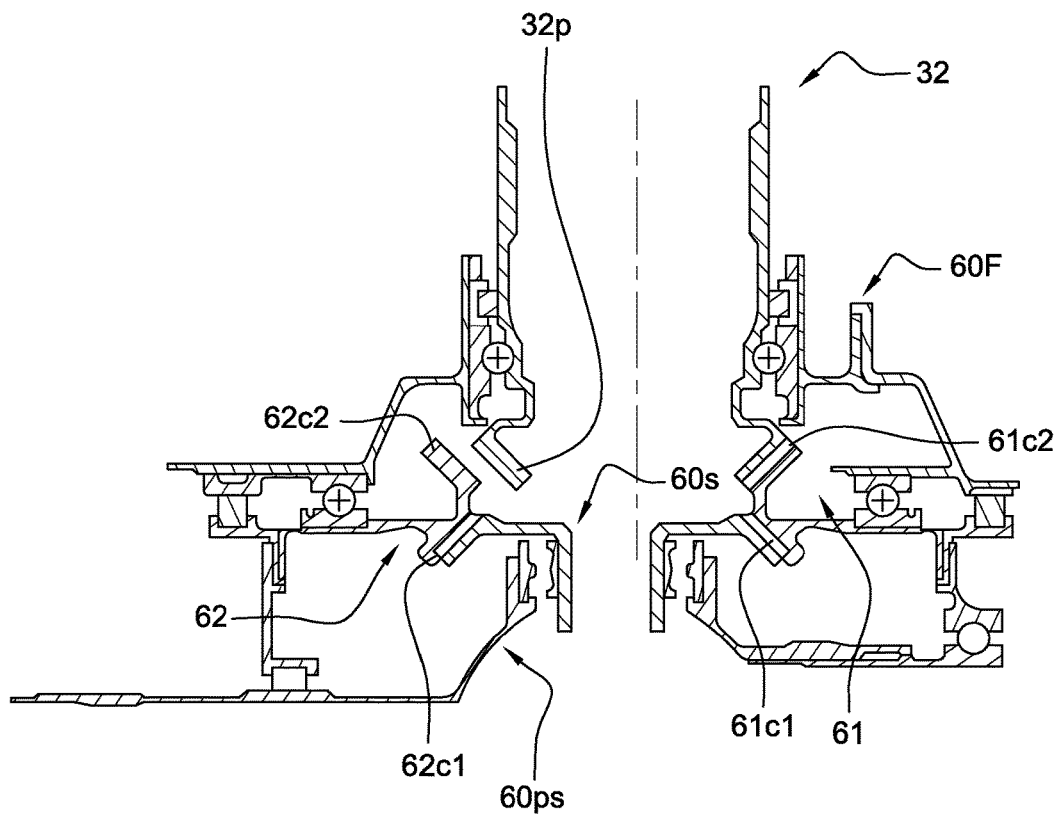
FIG. 3 shows the structure of the second differential epicyclic gear train in more detail.

FIG. 2 shows the two propellers 71 and 73 with their respective shaft 72 and 74. The mechanical power transmission chain, which the mechanism 15 forms, between the two motor shafts 32, 52 and shafts 72, 74, comprises a first differential epicyclic gear train 40 and a second differential epicyclic gear train 60.

The first differential epicyclic gear train 40 comprises a central sun wheel 40p, on which planet pinions 40s mesh. The planet pinions 40s are mounted on a planet carrier 40ps inside a ring 40c. The sun wheel 40p 40p, the planet carrier 40ps and the ring are rotatably mounted inside a differential casing which is not shown. They are also coaxial with the two concentric shafts 72 and 74. The ring is formed integrally with shaft 74 and the planet carrier is formed integrally with shaft 72.

The second differential epicyclic gear train 60 comprises, within a fixed casing which is not shown, a first moveable wheel 61, a second moveable 62, a planet carrier 60ps and planet pinions 60s. The planet carrier 60ps is formed integrally with a shaft 100 which is rotatably mounted within the fuselage and which is also formed integrally with the sun wheel 40p of the first differential epicyclic gear train 40. It should be noted that the shafts 100, 72 and 74 are supported by appropriate bearings, which are not shown, in the fixed structure of the fuselage. The shafts 100, 72, 74 are coaxial.

The planet carrier 60ps supports the planet pinions 60s whose axes are positioned in the same plane perpendicular to the shaft 100 and oriented radially with respect to the shaft 100. The two moving wheels are mounted by means of bearings in the casing 60f.

The movable wheels 61 and 62 each comprise a first ring gear, 61c1 and 62c1 respectively, and a second ring gear, 61c2 and 62c2 respectively. The first rings, 61c1 and 62c1 respectively, have the same radius, positioned in two planes which are perpendicular to the axis of the shaft 100 of the planet carrier while being opposite one another and axially distant from one another in such a way as to mesh on the planet pinions 60s. Here, the teeth of the pinions are at 45° with respect to the axis of the shaft of the planet carrier 100. The moveable wheels 61 and 62 each bear a second ring gear, 61c2 and 62c2 respectively. The second ring gear 61c2 of the wheel 61 has a greater diameter than that of the first ring 61c1 and meshes with a pinion 32p of the radial motor shaft 32. The radial motor shaft 32 extends outwardly towards the motor and is rotatably driven by it with the aid of a right-angle gearbox. Similarly, the wheel 62 comprises a second ring gear 62c2, here with a radius which is substantially equal to that of the ring 61c2 of the wheel 61. The ring 62c2 meshes with a pinion 52p which is formed integrally with the radial motor shaft 52. The two radial motor shafts 32, 52 are not placed in the same plane perpendicular to the axis of the shaft 100. The rings 61c2 and 62c2 form the two inputs of the second differential epicyclic gear train 60. The radial motor shaft 52 is connected by a suitable angular gearbox to the drive shaft of the second motor. The pinions 32p and 52p with their respective shaft are supported by the fixed structure. They form the planet wheels of the differential system.

The second differential epicyclic gear train 60 operates as follows: when the loads applied by the shafts 32 and 52 are the same, they rotatably drive the planet carrier 60ps around its axis by means of the planet pinions 60s which remain fixed in their station. If the forces applied by the motor shafts are no longer identical, the planet gears are rotated around their axis.

In all cases, the combined power of two motors is applied to the shaft 100 which drives the sun gear 40p of the first differential epicyclic gear train 40. This ensures the distribution of the load between the two propellers 71 and 73 at the output.

When a failure of the propellant occurs, it is possible with the arrangement of the invention to propel the aircraft directly by means of the gases coming from the motors 3 and 5. The continuity of propulsion is therefore ensured in this way.

The invention claimed is:

1. Aircraft comprising:
   a fuselage, a propulsion assembly at a tail cone of the fuselage and at least two motors each driving a motor shaft,
   the propulsion assembly comprising at least one propeller driven mechanically by the motor shafts,
   wherein the propulsion assembly comprises a first, propeller and a second propeller,
   each of the first and second propellers being driven respectively by a first propeller shaft and a second propeller shaft,
   said first and second propeller shafts being driven by the motor shafts by a transmission mechanism comprising a first differential epicyclic gear train and a second differential epicyclic gear train,
   the first differential epicyclic gear train comprising a first input which is connected to an output of the second differential epicyclic gear train and the second differential epicyclic gear train comprising two inputs, each of said two inputs of said second differential epicyclic gear train being mechanically connected to one of said motor shafts.

2. The aircraft according to claim 1, wherein the first differential epicyclic gear train comprises the first input and two outputs, the first input being mechanically connected to the two motor shafts and each of said two outputs driving one of the first and second propeller shafts.

3. The aircraft according to claim 1, wherein the axis of rotation of the first input of the first differential epicyclic gear train is coaxial with an axis of rotation of an output of the second differential epicyclic gear train.

4. The aircraft according claim 1, wherein the second differential epicyclic gear train comprises a planet carrier forming an output of the second differential epicyclic gear train, planet gears of the planet carrier meshing on two opposite rings which are coaxial with the planet carrier, the two rings each being driven by one of the motor shafts.

5. The aircraft according to claim 1, wherein the motor shafts are arranged radially with respect to an axis of rotation of the planet carrier.

6. The aircraft according to claim 1, wherein the motors are motors with each having an air input ducts spaced apart from the fuselage.

7. The aircraft according to claim 2, wherein the first differential epicyclic gear train comprises a sun gear at the first input, and a ring and a planet carrier at said two outputs.

8. The aircraft according to claim 5, wherein the planet gears of the second differential epicyclic gear train have a radial axis of rotation with respect to an axis of rotation of the planet carrier.

9. The aircraft according to claim 6, wherein the motors are configured to propel the aircraft in the event of failure of the propulsion assembly.

* * * * *